United States Patent [19]

Blanche et al.

[11] Patent Number: 5,788,848
[45] Date of Patent: Aug. 4, 1998

[54] APPARATUS AND METHODS FOR SEPARATING SOLIDS FROM FLOWING LIQUIDS OR GASES

[76] Inventors: Paul Blanche, 42 Wakool Avenue, Rosebud; Stephen Crompton, 11 Sydney Street, Rye, both of Victoria 3941, Australia

[21] Appl. No.: 750,706
[22] PCT Filed: Jun. 16, 1995
[86] PCT No.: PCT/AU95/00351
  § 371 Date: Mar. 24, 1997
  § 102(e) Date: Mar. 24, 1997
[87] PCT Pub. No.: WO95/35145
  PCT Pub. Date: Dec. 28, 1995

[30] Foreign Application Priority Data

Jun. 17, 1994 [AU] Australia ................... PM6825

[51] Int. Cl.⁶ .................. B01D 29/35; B01D 35/22; B01D 36/04; E02B 5/08
[52] U.S. Cl. .................. 210/162; 210/304; 210/306; 210/308; 210/309; 210/512.1; 210/804; 55/337; 55/459.1; 55/459.2; 95/268
[58] Field of Search .................. 210/162, 299, 210/304, 306, 307, 308, 309, 512.1, 804; 55/337, 459.1, 459.2; 95/268

[56] References Cited

U.S. PATENT DOCUMENTS

| 775,664 | 11/1904 | McVeety. |
|---|---|---|
| 964,428 | 7/1910 | Johnson et al.. |
| 1,100,435 | 6/1914 | Lance. |
| 1,699,828 | 1/1929 | Wyckoff. |
| 1,856,685 | 5/1932 | Anderson. |
| 1,897,195 | 2/1933 | Howden. |
| 2,039,692 | 5/1936 | Van Tongeren. |
| 2,071,975 | 2/1937 | Holm-Hansen et al.. |

(List continued on next page.)

FOREIGN PATENT DOCUMENTS

| 628745 | 9/1992 | Australia. |
|---|---|---|
| 61034/94 | 8/1994 | Australia. |
| 0098820 | 1/1984 | European Pat. Off.. |
| 2691487 | 11/1993 | France. |
| 1442417 | 11/1968 | Germany. |
| 2743580 | 3/1979 | Germany. |
| 8707094 U | 10/1987 | Germany. |

(List continued on next page.)

OTHER PUBLICATIONS

Brochure, "Water Pollution ... the enviromental time-bomb of the 90's".
Brochure, "Storm King", H.I.L. Technology, Inc.
Brochure, "Vortechs Stormwater Treatment System", Vortechnics.
Brochure, "Double-Drum Screens", Lyco Manufacturing, Inc.

(List continued on next page.)

*Primary Examiner*—Thomas M. Lithgow
*Attorney, Agent, or Firm*—Fitzpatrick, Cella, Harper & Scinto

[57] ABSTRACT

An apparatus and method for separating material which includes solid and/or particulate matter from flowing liquid and/or gas. The apparatus includes a separation panel positioned in a fluid flow path, and the separation panel is housed in a separation chamber. Fluid can be introduced into the separation chamber by an inlet to establish a circular flow of the fluid within a confine of the separation panel, so material entrained in the fluid is trapped within the confine of the separation panel. The separation panel, separation chamber and inlet can be dimensioned and disposed such that as the apparatus operates, the flow of the fluid outside the separation panel is in a direction opposite to a direction of the flow of the fluid within the separation panel. The separation panel can include plural deflection means for deflecting material entrained in the fluid away from the openings, and the deflection means are generally opposed to a direction of the flow of the fluid, each opening having one of the deflection means associated therewith.

18 Claims, 3 Drawing Sheets

U.S. PATENT DOCUMENTS

| | | |
|---|---|---|
| 2,087,789 | 7/1937 | Allardice . |
| 2,568,032 | 9/1951 | Stephanoff . |
| 2,571,331 | 10/1951 | Blomen . |
| 2,788,087 | 4/1957 | Lenehan . |
| 2,827,169 | 3/1958 | Cusi . |
| 2,913,114 | 11/1959 | Plaven . |
| 2,936,074 | 5/1960 | Forchee . |
| 2,998,137 | 8/1961 | Vane . |
| 3,487,931 | 1/1970 | Paulson . |
| 3,523,077 | 8/1970 | Camirand et al. . |
| 3,792,573 | 2/1974 | Borsheim . |
| 3,985,522 | 10/1976 | Kuhlmann . |
| 4,003,836 | 1/1977 | Stearns et al. . |
| 4,102,790 | 7/1978 | Portyrata . |
| 4,198,220 | 4/1980 | Keller . |
| 4,441,999 | 4/1984 | Frykhult . |
| 4,476,021 | 10/1984 | Souza . |
| 4,551,247 | 11/1985 | Borchert . |
| 4,584,003 | 4/1986 | Oda et al. . |
| 4,634,537 | 1/1987 | Schreiber . |
| 4,650,570 | 3/1987 | Fjällström . |
| 4,853,116 | 8/1989 | Wallander . |
| 4,855,038 | 8/1989 | LeBlanc . |
| 4,883,509 | 11/1989 | Giusti et al. . |
| 4,956,101 | 9/1990 | Holmberg . |
| 5,000,842 | 3/1991 | Ljokkoi . |
| 5,034,122 | 7/1991 | Wiesemann . |
| 5,126,039 | 6/1992 | Silander . |
| 5,524,770 | 6/1996 | LeBlanc et al. . |
| 5,543,038 | 8/1996 | Johannessen . |
| 5,624,558 | 4/1997 | Aaltonen et al. . |

FOREIGN PATENT DOCUMENTS

| | | |
|---|---|---|
| 9114607 | 4/1992 | Germany . |
| 4211752 | 10/1993 | Germany . |
| 59-18805 | 1/1984 | Japan . |
| 62-171719 | 7/1987 | Japan . |
| 1177176 | 4/1966 | United Kingdom . |
| 1408003 | 10/1975 | United Kingdom . |
| 2100150 | 12/1982 | United Kingdom . |
| 94/17896 | 8/1984 | WIPO . |
| 86/07106 | 12/1986 | WIPO . |
| 91/17811 | 11/1991 | WIPO . |

OTHER PUBLICATIONS

"Grant to keep the beaches cleaner", Government Officer (May 17, 1995), p. 25.

Weir, L. "New pollution device offers hope for rivers", The Advertiser (Jun. 7, 1995), p. 22.

Wong, T. "An Innovative Gross Pollutant Trap for Stormwater Treatment", Proc. Institution Engs., 2d Int'l Symp. Urban Stormwater Management, Australia (Jul. 1995), pp. 407–412.

"Local invention a world first", The Southern Peninsula Local, vol. 2, No. 16 (Oct. 17, 1995), cover, p. 13.

Gilchrist, G. "Now rubbish won't go with the flow", The Sydney Morning Herald (Nov. 8, 1995), p. 6.

Lake, T. "Hope for a cleaner Balmoral", Mosman Daily (Nov. 16, 1995), p. 5.

Strong, G. "Victoria ignores its own pollution beater", The Sunday Age News (Dec. 24, 1995), p. 4.

"Sifting through the rubbish", Mainstream, vol. 5 (Spring 1996).

Phelan, A. "'Snail' drains set the pace", The Northern Herald (May 23, 1996).

Thomas Register, pp. xx–yy (1990).

Gregory, P. "Sump cuts debris in runoff", NZ Herald, Section One (Jul. 11, 1996), p. 15.

"Cans, bottles, cups, bags surface in waste clean–up", Leader (Aug. 15, 1996).

"Risk Management Research Plan for Wet Weather Flows", National Risk Management Research Laboratory, U.S. E.P.A. (Nov. 1996).

Grant Amendment Application "Pilot–Scale Demonstration of the Continuous Deflection Separation Technology for SSO", U.S. E.P.A. (Sep. 9, 1996).

Wong, T. et al. "A Solid Separator Using a Continuous Deflective System", 7th Int'l Conf. Urban Stormwater Drainage, Germany (Sep. 9–13, 1996).

Winkler, T. "Street habits choke drains, study finds", The Age (Oct. 4, 1996), p. A7.

Allison, R. et al. "The Pollutec Stormwater Pollution Trap: Field Trails", Water (Nov. 12, 1996), pp. 29–33.

"Proposal for Lake Merritt Watershed Stormwater Pollution Reduction Program", submitted by City of Oakland, Office of Public Works (1997).

"Perry's Chemical Engineers' Handbook", sixth ed., pp. 17–56 and 17–57 McGraw–Hill Book Co., NY.

APPARATUS AND METHODS FOR SEPARATING SOLIDS FROM FLOWING LIQUIDS OR GASES

FIELD OF THE INVENTION

This invention relates to apparatus and methods for separating solids or particulate matter from flowing liquids or gases. The invention has particular, although not exclusive, application to the filtration of floating and entrained solids from discharges of water. One particular application of the invention is in relation to storm water drain technology.

BACKGROUND OF THE INVENTION

There are many applications where it is desirable to separate solids from a flowing liquid. Such applications include the following.

1. Separation of solids from storm water

In many parts of the world, storm water is directed to waterways and seas. Storm water is a major carrier of solid pollutants, such as plastics, cans, tree branches and animal faeces, amongst other things, to waterways and seas.

Endeavours have been made to date, to limit the passage of at least some of these materials to waterways and seas. One method which has been used is to employ grates across outlets from the drains. This method has been generally unsatisfactory because the size of the grate must often be such as to enable water to pass, even if solid material is held against the grate by water pressure. Accordingly, it has been necessary that the grate be of substantial opening size. A further problem is that even large grates can become blocked, and it is essential to provide a flow path around or over the grate to prevent build up of water upstream in the drainage system. A second alternative proposed has been the use of systems, such as cyclones and dynamic separators, to remove the waste. While these can be efficient in some circumstances, they are often too expensive to be used in the whole of a storm water drainage system.

2. Separation of liquid from sewerage

A major difficulty with many sewerage plants is the sheer volume of liquid to be handled. This is aggravated where a "mixed" system, that is, a system which carries both sewerage and storm water, is used. In many cases, sewerage plants could handle more sewerage if the quantity of liquid delivered could be reduced. This could occur if, for example, liquid was removed from the sewerage before it enters into trunk sewers. To date, this has not been considered feasible.

Further, there are also many regions in the world where storm water and sewerage are received by the same system. This can cause difficulties where there are heavy rains which overload the system, as it is undesirable to permit raw sewerage to pass to overflow.

3. Removal of pollutants from industrial wastes

Many industrial plants must pay prohibitive rates to discharge polluted liquids into sewers. It would be most desirable to separate a part of the pollution before the waste is delivered to sewers, and this will provide economies both to the plant and to the authority, if the cost of the earlier removal of polluted matter was less than the cost of cleaning up pollution at a later time.

These are merely illustrations of the many uses to which an apparatus or method for separating solids from a flowing liquid, could be put. There are many other such applications which could be described.

In our International Patent Application number PCT/AU94/00061, we disclosed and claimed apparatus and methods for separating solids from flowing liquids. We believe that the apparatus and methods disclosed in that application provide very good results in applications requiring the separation of solids from flowing liquids. We have now developed improvements and/or refinements to the invention disclosed in that application, which we believe provide even better results than those disclosed in our earlier application.

SUMMARY OF THE INVENTION

The present invention generally provides an apparatus for separating solid or particulate matter from a flowing liquid or gas, the apparatus including:

a separation panel positioned in the path of flow of the liquid or gas, the separation panel including a plurality of openings, wherein the openings are of a predetermined size such that only solid or particulate matter smaller than that size is able to pass through the openings, and wherein further, the configuration and arrangement of the openings on the separation panel is such that in use of the apparatus, solid or particulate matter larger than the predetermined size is substantially prevented from adhering to or obstructing the separation panel.

Preferably, the arrangement of the openings in the separation panel is such that, in use of the apparatus, the openings are disposed at an angle relative to the direction of flow of the liquid or gas.

Preferably further, the configuration of the openings is such that each opening includes a deflection means generally opposed to the direction of flow of the liquid or gas, to assist in deflecting solid or particulate matter entrained in the flow, away from the openings. In a preferred form of the invention, the separation panel takes the form of a curved structure.

It is particularly preferred that the apparatus includes a generally cylindrical separation panel. It is particularly preferred that the separation panel is in the form of an open ended generally cylindrical structure. In this preferred form of the invention, it is also preferred that the separation panel forms part of a larger separation chamber, into which, in use of the apparatus, the liquid or gas flow is introduced by an inlet means, so as to establish a circular flow of the liquid or gas within the separation panel. This circular flow enables solids or particulate matter of a predetermined size entrained in the liquid or gas, to be trapped and to circulate within the confines of the separation panel. The circular motion of the flowing liquid or gas within the separation panel also results in the entrained solids or particulate matter generally not adhering to the separation panel, but being entrained in the circular motion of the liquid or gas. In this way, the establishment of a circular flow motion of the gas or liquid within the separation panel is such as to enable the separation panel to act as a generally self-cleaning filter for the solid or particulate matter entrained within the flowing liquid or gas. The fact that the liquid or gas is able to pass freely through the openings in the separation panel means that the panel is able to filter solid or particulate matter of a predetermined size from the flowing liquid or gas, thereby enabling the liquid or gas to be discharged to an outlet means, at least substantially filtered of the solid or particulate matter.

It is also preferred that the configuration of the apparatus is such that in use, the flow of the liquid or gas outside the confines of the separation panel is in a direction opposite to the direction of flow of the liquid or gas within the confines of the separation panel. Such a configuration assists in maintaining the self-cleaning function of the separation panel, in use of the apparatus.

Preferably, the apparatus also includes means for facilitating the collection of the solid or particulate matter into a receptacle, from which it may be removed. In some embodiments of the invention, gravitational forces may combine with the circular motion of the gas or liquid within the cylindrical separation panel, so as generally to encourage the deposition of the solid or particulate matter into a receptacle which may be positioned generally below and/or above the separation panel, depending upon the specific gravity of the solid or particulate matter. In the case of solids or particulate matter having a lower specific gravity than the liquid or gas, they will tend to float on the surface of the liquid or gas, in which case, they can be collected by a receptacle generally disposed above the separation panel. In the case of solids or particulate matter having a higher specific gravity than the liquid or gas, they will tend to settle under the action of gravitational forces, in which case, a receptacle to capture them will generally be positioned below the separation panel.

The apparatus may also include mechanical means to assist the deposition of the solid or particulate matter in the receptacle, through the action of gravity. Such means could take any number of forms, but would include, for example, providing the receptacle with a baffle or flange directed downwardly to encourage the deposition of settleable solid or particulate matter.

The invention also provides a method for separating solid or particulate matter from a flowing liquid or gas, the method including the steps of:

positioning a separation apparatus in the path of flow of the liquid or gas; and providing the separation apparatus with a separation panel having a plurality of openings therethrough, wherein the openings are of a predetermined size such that only solid or particulate matter smaller than that size is able to pass through the openings, and wherein further, the configuration and arrangement of the openings on the separation panel is such that in use of the apparatus, solid or particulate matter larger than the predetermined size is substantially prevented from adhering to, or obstructing the separation panel.

Preferably further, in the method, the arrangement of the openings is such that, in use of the apparatus, the openings are disposed at an angle relative to the direction of flow of the liquid or gas.

It is also preferred, in the method, that each of the openings includes a deflection means generally opposed to the direction of flow of the liquid or gas, to assist in deflecting solid or particulate matter entrained in the flow, away from the opening.

Preferably, in the method described above, the separation panel takes the form of a curved structure.

Preferably further, in the method described above, the separation panel takes the form of a generally cylindrical structure, and the separation apparatus includes inlet and outlet means for directing the flow of liquid or gas into, and out of, the separation apparatus respectively. It is particularly preferred that the separation panel is an open ended generally cylindrical structure.

It is particularly preferred, in the said method, that the arrangement is such that the liquid or gas is introduced into the separation apparatus via the inlet means and presented to a separation chamber which includes a generally cylindrical separation panel, so that a circular motion of the liquid or gas is established within the confines of the separation panel, so as generally to trap solid or particulate matter of a predetermined size within the separation panel, yet at the same time, permit the liquid or gas to pass therethrough freely, and so that the separation panel is continually cleaned by the circular motion of the liquid or gas within it.

Preferably further, in the method, the configuration of the apparatus is such that in use, the flow of the liquid or gas outside the confines of the separation panel is in a direction opposite to the direction of flow of the liquid or gas within the confines of the separation panel, so as to assist in maintaining the self-cleaning function of the separation panel, in use of the apparatus.

Preferably further, the method also includes the step of providing means to facilitate the collection of the solid or particulate matter separated by the method, from the flowing liquid or gas. Such means could, for example, utilise the assistance of gravitational forces, to assist in the collection of the solid or particulate matter.

Preferably further, the method also includes means for facilitating the removal from the separation apparatus, of solids or particulate matter separated from the flowing liquid or gas.

DESCRIPTION OF PREFERRED
EMBODIMENTS OF THE INVENTION

In order that the invention may be further understood, we will now describe preferred embodiments of it, by way of example only, with reference to the accompanying drawings, in which.

Figure 1:
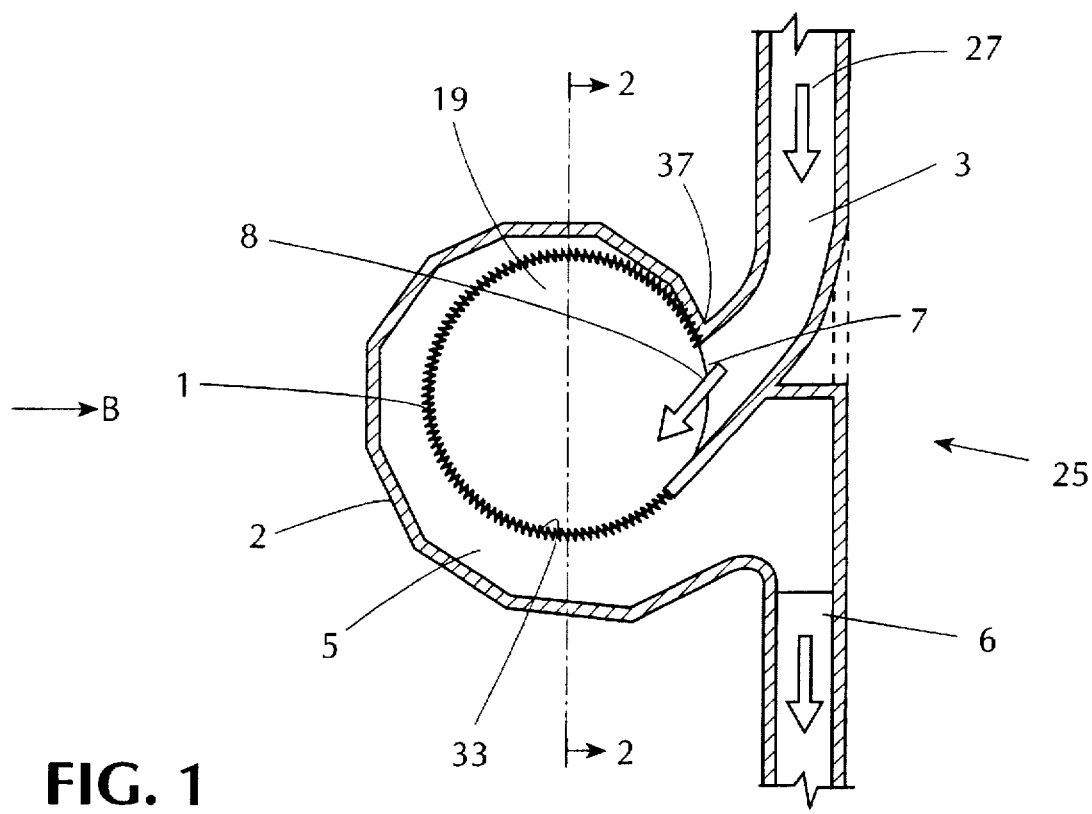
FIG. 1 is a plan view of one example of a separator made in accordance with the invention.

Referring now to the accompanying drawings, FIG. 1 shows a plan view of an apparatus which could be used to separate solids from a flowing liquid, such as water (and particularly, storm water). The apparatus shown, generally denoted 25, includes a separation panel 1, which as depicted, is of a generally circular shape, when viewed in horizontal cross-section. When viewed in three dimensions (as shown more particularly in FIG. 2), it can be seen that the separation panel 1 has an open-ended generally cylindrical configuration.

Figure 2:
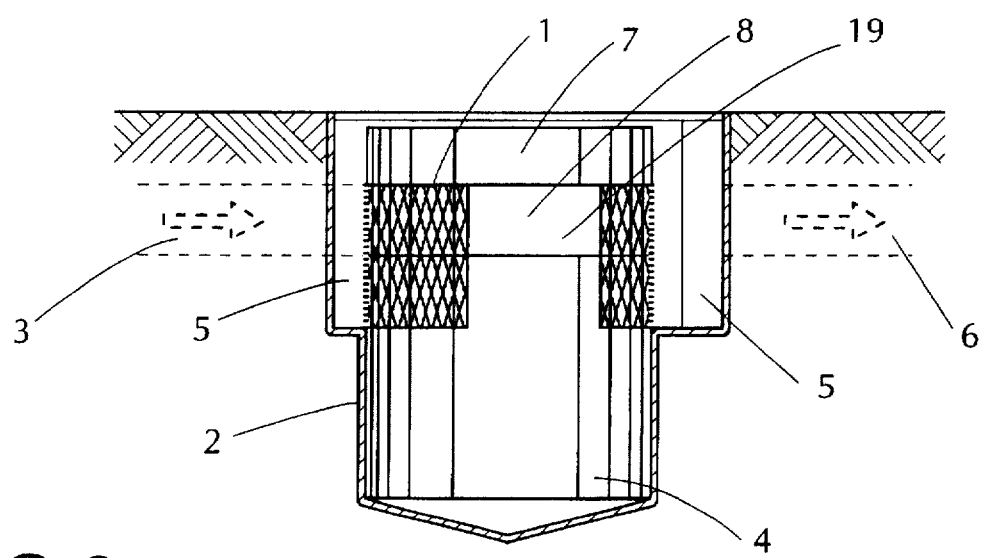
FIG. 2 represents a view (in the direction of the arrow marked "B" in FIG. 1) of a vertical section of the separator shown in FIG. 1, taken along the line 2—2 in that Figure.

As shown in FIGS. 1 and 2, the separation panel 1 is located within a separation chamber 2. The liquid enters the separation apparatus 25 via an inlet means 3, in the direction of the arrow 27 shown in FIG. 1. As shown in FIG. 1, the inlet channel 3 curves to the left until reaching the body 37 of the separator 25, where water and entrained solids or particulate matter are presented through an opening 8 into the interior 19 of the separation panel 1. The generally cylindrical configuration of the separation panel 1 is such that when the water leaves the opening 8 and enters the interior (or confines) 19 of the separation panel 1, a circular flow motion is established within the confines 19 of the separation panel 1, in the direction shown by the arrow 29 shown in FIG. 1.

Figure 3:
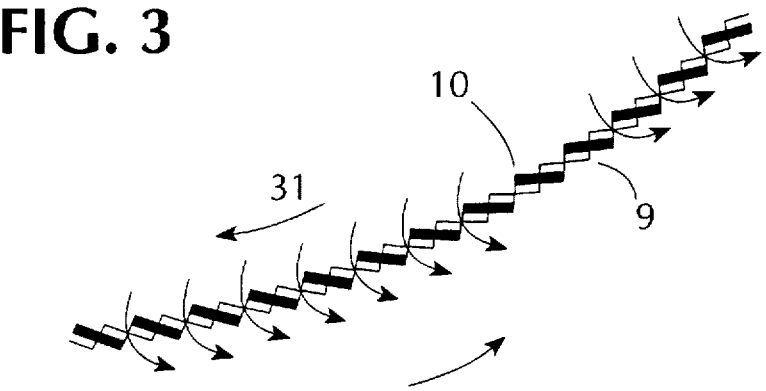
FIG. 3 shows an enlarged horizontal section of part of a separator panel for use in the invention.

Referring now to FIG. 3, it will be seen that the exemplary separation panel 1 depicted consists of a number of deflection means in the form of solid deflective segments 10 which generally present a closed face to the direction of flow of the liquid (as shown by the arrow numbered 31 in FIG. 3) within the separation panel 1. Behind each deflective segment 10 in the separation panel, there is an opening 9. As illustrated, each opening 9 is disposed at an angle to the direction of flow of the liquid in the separation panel 1. Moreover, the openings 9 are all of a predetermined size, which is such as to permit the passage only of particulate matter smaller in size than that of the openings. The liquid is of course, also able to pass freely through the openings. In use of the separation apparatus 25, the effect of this arrangement of features is that only the liquid, and solids or particulate matter of a size smaller than that of the openings 9 are able to pass through the separation panel. Solids or particulate matter of a larger size are therefore trapped within the confines 19 of the separation panel. Moreover, the circular motion of the liquid within the confines 19 of the separation panel means that trapped solids or particles are continuously deflected from the interior wall 33 of the separation panel. The net effect of this arrangement is therefore that the separation panel 1 is substantially self-cleaning.

Solids trapped within the confines 19 of the separation panel are therefore caused to continue moving by the circular flow until they settle under gravity, or, if floatable, are retained on the surface. At the same time, untrapped solids and the liquid are able to pass through the separation panel into the upper portion 5 of the separation chamber 2, and thence to the outlet means 6 (which, as shown in FIG. 1, may take the form of a channel, pipe or other suitable outlet structure).

As shown in FIG. 3, preferably, the flow of the liquid or gas outside the confines of the separation panel is in a direction opposite to the direction of its flow within confines. This counter-current flow motion on opposite sides of the separation panel establishes a kinetic equilibrium which in turn facilitates the generally self-cleaning function of the circular flow motion established within the confines 19 of the separation panel.

Figure 4:
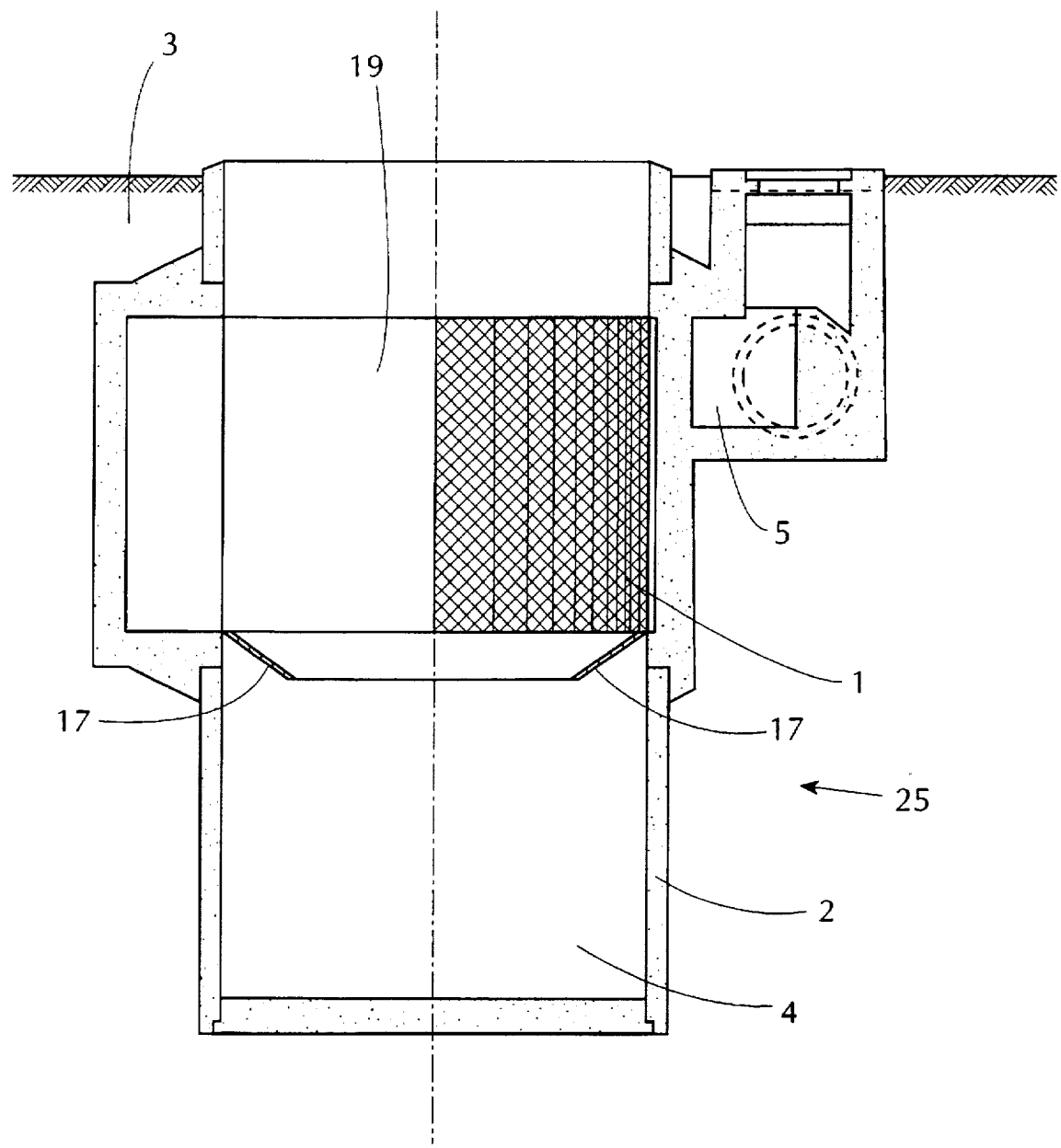
FIG. 4 is a view from the side of a vertical section through an exemplary separator made in accordance with the invention.

As shown in FIGS. 2 and 4, the separation apparatus 25 may also include a receptacle 4, such as a collection sump, for the containment (and removal, if desired) of settleable solids. The sump 4 may be sized or configured so as to slow down the circular flow of the liquid at the lower portion of the apparatus 25, so as to facilitate settlement of solids. The sump 4 may also be provided with any suitable means to facilitate the removal of settled solid or particulate matter. Such means could include, for example, periodic removal by education, or a mechanical bucket or basket that is suspended in the sump. Floatables which are left floating on the top of the body of water treated by the separation apparatus 25 could be removed by any convenient means.

As shown more particularly in FIG. 4, the separation apparatus may also include means for assisting the settlement of solids into the sump 4. The means shown in FIG. 4 take the form of a downwardly directed annular flange or baffle 17, which assists in directing downwardly moving solids into sump 4. The flange or baffle 17 also substantially prevents the circular motion of the liquid or gas within the upper regions of the separation chamber from being transferred into the sump 4.

Referring now to FIG. 2, as illustrated, the cylindrical separation panel 1 may be fitted with a continuation part 7 of the same material (or of another, generally impervious material) above the level of the normal inlet flow. This continuation part 7 ensures the retention of floating solids if the separation apparatus is subjected to head pressure (eg during flood conditions), if the apparatus is being used, for example, for the removal of litter from urban stormwater runoff.

Where particularly "purified" liquids or gases are required at the conclusion of the filiation procedure, it is possible for the outlet from one separation apparatus according to the invention to feed into the inlet for a second such separator, and therefore, for the liquid or gas to be filtered sequentially by two or more such separators, arranged in series. In such an arrangement, the size of the openings in the separation panels for the second and subsequent separators could be sequentially (and increasingly) smaller, so that each subsequent separator removes increasingly finer particles. Hence, by this arrangement, very high, or indeed, any desired level of filtration or purification could be achieved.

While much of the aforegoing description of the preferred embodiments has been concerned with apparatus for separating solids entrained in liquids, it is to be understood that the invention is equally applicable to the separation of solids entrained in gases. Generally, for more efficient operation of gas/solid separators constructed in accordance with the invention, it would be necessary for the separator to be constructed as a sealed unit, so as to prevent the undesired escape of gases undergoing filtration. (This is a feature which could also be utilised in some liquid/solid separators constructed in accordance with the present invention). In this way, solid matter entrained in exhaust gases and gaseous emissions from various manufacturing plants, could be filtered in much the same way as solid-bearing liquids are treated, using the apparatus and methods of the present invention.

Those skilled in the art will therefore readily appreciate that the apparatus and methods of the present invention are capable of being put to many different uses, and that they embrace many modifications and variations. It is therefore also to be understood that the spirit and scope of the present invention is in no way limited to the particular details of the preferred embodiments described herein, but extends to, and is to be determined by reference to each novel feature and combination of features defined by the appended claims.

We claim:

1. An apparatus for separating a material comprising at least one of a solid matter and a particulate matter from a fluid comprising at least one of a flowing liquid and a flowing gas, the apparatus comprising:

a separation panel having a concave inner side defining a confine and said panel having a convex outer side, said separation panel being positioned in a path of a flow of the fluid, the separation panel including a plurality of openings, wherein the openings are of a predetermined size such that only the material which is smaller than that size passes through the openings, and wherein further, the openings on the separation panel have a configuration and an arrangement such that the material that is larger than the predetermined size is substantially prevented from at least one of adhering to and obstructing the separation panel; and a separation chamber which houses the separation panel, inlet means for introducing the fluid containing said material into the separation chamber ans into the confine of the coarse inner side of the separation panel so as to establish a circular flow of the fluid within said confine of the separation panel, whereby the material of at least the predetermined size entrained in the fluid is trapped within the confine of the separation panel while the fluid passes through the separation panel, wherein the separation panel, the separation chamber and the inlet means are dimensioned and disposed such that as the apparatus operates, the separation panel is self-cleaning, and wherein the separation panel, the separation chamber and the inlet means are dimensioned and disposed such that as the apparatus operates, the flow of the fluid on the convex outer side of the separation panel which is outside the confine of the separation panel is in a direction opposite to a direction of the flow of the fluid on the concave inner side of the separation panel which is within the confine of the separation panel, so as to contribute to the self-cleaning of the separation panel and wherein said apparatus further comprises collecting means positioned below the separation panel for collecting the material that is trapped within the confine of the separation panel.

2. An apparatus as claimed in claim 1, wherein the separation panel is in the form of a generally cylindrical structure.

3. An apparatus as claimed in claim 1, wherein the separation panel is an open ended generally cylindrical structure.

4. An apparatus as claimed in claim 1, wherein the arrangement of the openings in the separation panel is such that the openings are disposed at an angle relative to the flow of the fluid.

5. An apparatus as claimed in claim 1, wherein the collecting means comprises a biasing means for biasing which utilises a gravitational force to encourage settlement of settleable said material.

6. An apparatus as claimed in claim 5, wherein the biasing means comprises at least one downwardly directed baffle or flange which encourages deposition of settleable said material.

7. An apparatus as claimed in claim 1, wherein the collecting means further comprises a receptacle for collecting the material.

8. An apparatus as claimed in claim 7, wherein the apparatus additionally includes removing means for removing the material from the receptacle.

9. An apparatus as claimed in claim 8, wherein the removing means for removing the material from the receptacle comprises a removable container provided with the receptacle into which the material is received during use of the apparatus.

10. A method for separating a material comprising at least one of a solid matter and a particulate matter from a fluid comprising at least one of a flowing liquid and a flowing gas, the method including the step of:

positioning a separation apparatus in a path of a flow of the fluid, the separation apparatus comprising a separation panel having a concave inner side defining a confine and said panel having a convex outer side, said separation panel having a plurality of openings therethrough, wherein the openings are of a predetermined size such that only the material which is smaller than that size passes through the openings, and wherein further, the openings on the separation panel have a configuration and an arrangement such that the material that is larger than the predetermined size is substantially prevented from at least one of adhering to and obstructing the separation panel, and a separation chamber which houses the separation panel;

introducing the fluid into the separation chamber and into the confine of the concave inner side of the separation panel by an inlet means so as to establish a circular flow of the fluid within said confine of the separation panel, whereby the material of at least the predetermined size entrained in the fluid is trapped within the confine of the separation panel while the fluid passes through said separation panel, wherein the separation panel, the separation chamber and the inlet means are dimensioned and disposed such that as the apparatus operates, the separation panel is self-cleaning, and wherein the separation panel, the separation chamber and the inlet means are dimensioned and disposed such that as the separation apparatus operates, the flow of the fluid on the convex side of the separation panel which is outside the confine of the separation panel is in a direction opposite to a direction of flow of the fluid on the concave side of the separation panel which is within the confine of the separation panel, so as to contribute to a self-cleaning function of the separation panel and collecting the material that is trapped within the confine by means of a collecting means positioned below the separation panel.

11. A method as claimed in claim 10, wherein the separation panel is in the form of a generally cylindrical structure.

12. A method as claimed in claim 10, wherein the separation panel is an open ended generally cylindrical structure.

13. A method as claimed in claim 10, wherein the arrangement of the openings in the separation panel is such that the openings are disposed at an angle relative to the flow of the fluid.

14. A method as claimed in claim 10, wherein the collecting is performed by biasing the material using a gravitational force to encourage settlement of settleable said material.

15. A method as claimed in claim 14, wherein the biasing is caused by providing at least one downwardly directed baffle or flange which encourages deposition of settleable said material.

16. A method as claimed in claim 10, wherein the collection means further comprises a receptacle for collecting the material.

17. A method as claimed in claim 16, further comprising the step of removing the material from the receptacle.

18. A method as claimed in claim 17, wherein the removing of the material from the receptacle is performed using a removable container provided with the receptacle into which the material is received during use of the apparatus.

* * * * *

UNITED STATES PATENT AND TRADEMARK OFFICE
CERTIFICATE OF CORRECTION

PATENT NO.  : 5,788,848

DATED       : August 4, 1998

INVENTOR(S) : PAUL BLANCHE ET AL.

It is certified that error appears in the above-identified patent and that said Letters Patent is hereby corrected as shown below:

On the title page

Insert: --[73] Assignee: CDS Technologies Limited,
        Victoria, Australia--.

COLUMN 2

Line 32, "In" should read --¶ In--.

COLUMN 6

Line 5, "filiation" should read --filtration--.
    Line 61, "ans" should read --and--.
    Line 62, "coarse" should read --concave--.

Signed and Sealed this

Eighth Day of June, 1999

Attest:

Q. TODD DICKINSON

Attesting Officer

Acting Commissioner of Patents and Trademarks